United States Patent

Chacour et al.

[11] 4,380,401
[45] Apr. 19, 1983

[54] BEARING SUPPORT

[75] Inventors: Selim A. Chacour; John R. Degnan, both of York, Pa.

[73] Assignee: Allis-Chalmers Corporation, Milwaukee, Wis.

[21] Appl. No.: 264,218

[22] Filed: May 15, 1981

[51] Int. Cl.³ .............................................. F16C 35/02
[52] U.S. Cl. ..................................... 384/438; 384/441
[58] Field of Search ...................... 308/22, 26, 15, 27; 384/192, 193, 202, 215, 252, 428, 438, 441

[56] References Cited

U.S. PATENT DOCUMENTS

| 2,657,912 | 11/1953 | Liebman et al. | 308/22 X |
| 3,388,880 | 6/1968 | Knight | 308/22 |
| 3,951,477 | 4/1976 | Townshend | 308/22 |

Primary Examiner—Stuart S. Levy
Assistant Examiner—David Werner
Attorney, Agent, or Firm—Timothy R. Conrad

[57] ABSTRACT

A stiff bearing support for the guide bearing of a drive shaft of a hydro-turbine machine which effectively isolates the radial movement of a grounded head cover from that of the bearing surface while it solidly transfers the lateral bearing reaction load to the grounded head cover.

4 Claims, 2 Drawing Figures

BEARING SUPPORT

BACKGROUND OF THE INVENTION

In large hydro-turbine machinery in which the main drive shaft is supported by journal bearings, the turbine bearing functions as a stiff bearing because it has been the normal practice of directly connecting it to a massive adjacent head cover which, in turn, is solidly grounded or anchored as being connected to the powerhouse concrete. This arrangement functions satisfactorily as long as the axisymmetric deformation of the bearing support connection to its head cover is not too large. When the axisymmetric deformation becomes too large, as encountered with relatively large hydro-turbine machinery, the bearing support transfers an unacceptable large portion of the radial movement of the adjacent head cover component to the bearing surface causing the bearing clearances to change with different machine operations. Detrimental effects experienced with existing bearing support arrangements include excessive vibration and machine efficiency losses resulting from the requirement that larger seal bearing clearances in shaft system designs accommodate the variable bearing bore diameter.

SUMMARY OF THE INVENTION

The present invention provides a stiff bearing for a drive shaft by a bearing support which effectively isolates the radial movement of its attachment flange to a heavy adjacent component such as a grounded head cover structure from that of the bearing surface.

To this end, the present bearing arrangement provides a bearing support cone structure which is arranged to receive and carry the drive shaft unbalance and other lateral loading. The bearing support cone structure is able to carry the lateral or shear load with a minimum of bending deformation due to its inherent high moment of inertia. Also, the relatively low hoop stiffness of the cone structure allows the deformation of the mounting flange to follow any radial or angular movement of the head cover component. As a result, a moderate stress response is experienced which is controllable by the thickness of the cone structure. The extent of bearing radial growth is dependent on the distance between the application of: (1) the lateral bearing load on the cone structure as transmitted by the bearing housing ribs, and, (2) the axisymmetrical loads on the cone structure mounting flange by the adjacent head cover component.

DESCRIPTION OF THE INVENTION

Figure 1:
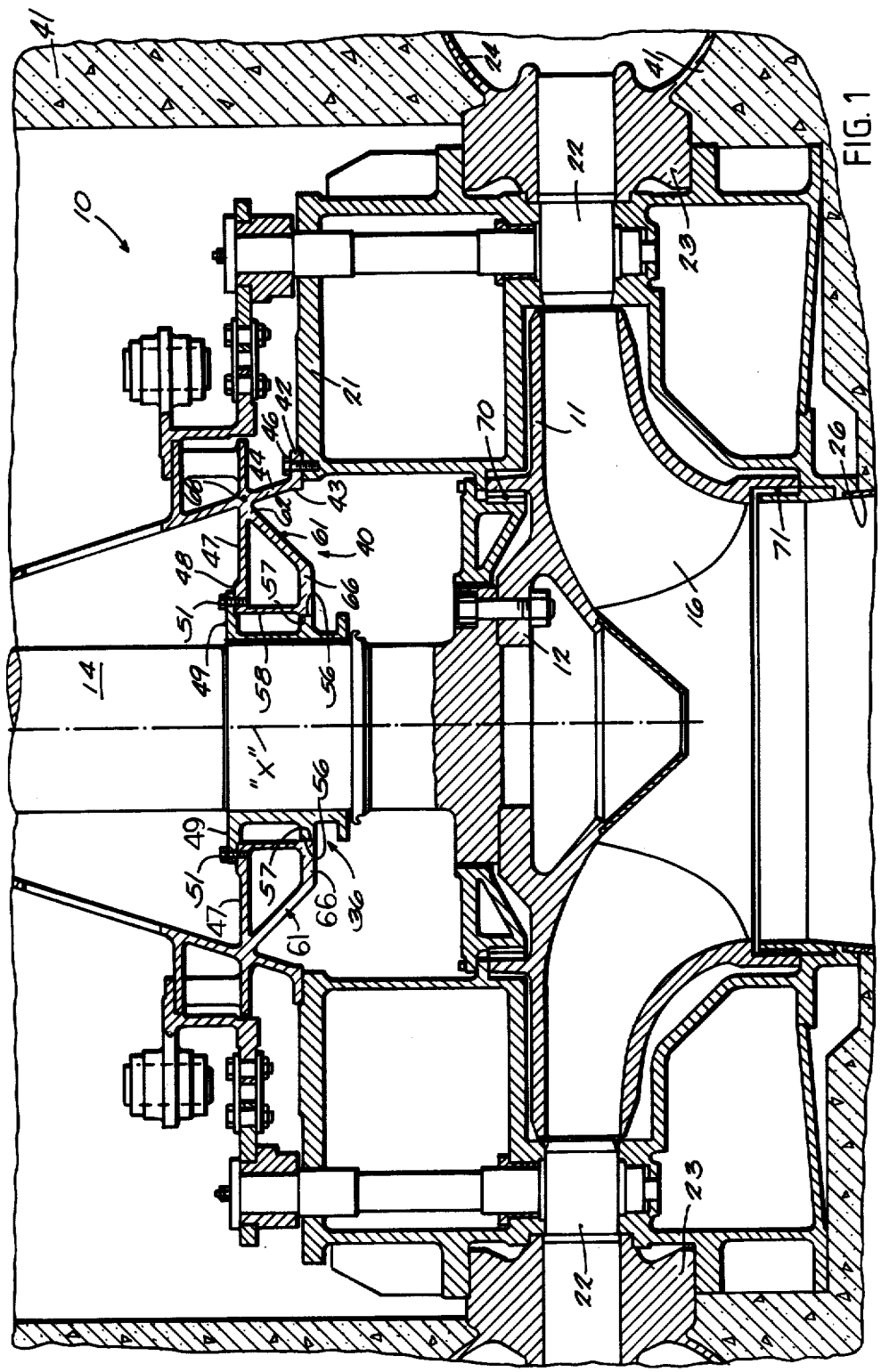
FIG. 1 is a fragmentary view in vertical section through a pump turbine machine showing the drive shaft bearing support arrangement of the present invention; and, FIG. 2 is an enlarged schematic showing the bearing support of FIG. 1.
Figure 2:
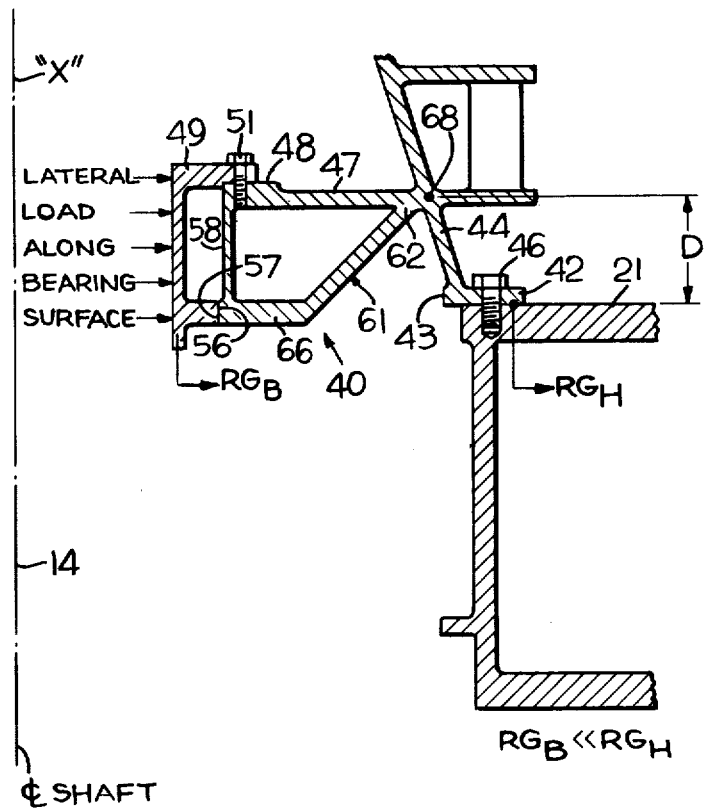

The invention is incorporated in a pump/turbine machine 10 which includes an impeller runner 11 having a hub 12 secured on the end of the vertical drive shaft 14. Attached to the hub 12 are fixed blades 16 of the runner 11. The turbine includes a grounded circular head cover 21 that covers the turbine runner 11 and contains wicket gates 22. A stay ring 23 joins a spiral case 24 with the top and bottom of the turbine; a draft tube 26 is provided for the exit flow of water from the turbine 10.

The turbine shaft 14 is connected to and driven by the rotation of the runner 11 in a conventional manner, such as by fitted bolts extending in the runner crown plate. The shaft 14, in turn, is connected to a generator (not shown) in the conventional manner for the production of electricity.

The lower end of the shaft 14 is supported in a bearing 36 carried by a bearing support means 40. As shown, the bearing support means 40 is rigidly secured to the head cover 21 which is grounded to the concrete foundation 41 via a stay ring 23.

When the turbine is in operation, the head cover 21 has a relatively large amount of radial movement. If a large amount of this radial movement is transferred to the bearing support and, thus, to the bearing 36, the bearing clearance will change with different machine operations. The transfer of the radial movement causes excessive vibration, increases noise level, and, causes machine efficiency losses. This inferior machine behavior is caused by larger required seal clearances 70, 71 to accommodate the variable shaft runout which occur in response to the radial bearing growth.

To eliminate a substantial amount of the excessive vibration and machine efficiency loss, the circular bearing support 40 is provided and is characterized by an ability to carry a lateral or shear load with a minimum of bending deformation because of an inherent high moment of inertia and thereby provides the large stiffness required of such a bearing support. To this end, as shown, the bearing support 40 includes an annular mounting flange 42 formed on the lower circular edge 43 of a bearing support cone 44. The mounting flange 42 engages on the upper inside surface of the head cover 21 being rigidly secured in position by a plurality of bolts, one of which is shown, 46. Radial bearing ribs 47, welded to or integrally formed with the bearing support cone 44, extend inwardly towards the vertical axis "x" of the machine and are provided with a bearing mounting flange pad 48. The mating circular radial flange 49 of the bearing is adapted to seat on the circular mounting flange pad 48 and is secured in position by a plurality of bolts 51. The bearing is provided with an intermediate outwardly extending radial stop pad 57 which engages radial abutment or seat 56 formed on the lower end of the vertical rib 58 of the bearing support.

For transferring the bearing load to the bearing supporting cone 44, the bearing support includes ribs 61 and the previously mentioned ribs 47. As shown, the ribs 61 have an oblique orientation, the upper end 62 of which is integrally formed with the ribs 47. The opposite lower end of the ribs 61 are jointed with a flange 66 in the horizontal plane. The flange 66 is integrally constructed with the lower end of the vertical rib 58 adjacent to the seat surface 56. The juncture of the end 62 of ribs 61 with the end of ribs 47 with the bearing supporting cone 44 forms a juncture point 68 which serves to transfer the bearing load to the bearing supporting cone 44.

The novel bearing support results in an ability to carry a lateral or shear load with a minimum of bending deformation, due to the high moment of inertia of cone 44, thus providing required stiffness. The relatively low hoop stiffness of the cone 44 allows the deformation of the bearing mounting flange 42 to follow any radial or angular movement of the head cover structure 21 which is grounded to the conventional concrete powerhouse structure 41. A moderate stress response results and is controlled by the thickness of cone 44. The extent of bearing radial growth that is permitted by the bearing support is dependent on the distance "D" between the application of the lateral bearing load on cone 44 via rib 61 and the axisymmetric loads on the mounting flange 42 by the head cover 21.

To sum up the operation of the novel bearing support, the supporting cone 44 transfers bearing lateral load to the grounded head cover 21. Simultaneously, the head cover 21 deflects radially due to other external loading imposed by the machinery. The bearing cone mounting flange 42 must also follow the movement of the head cover 21 where they are rigidly connected to each other. With the structure described, it has been founded that the radial growth of bearing 36, represented by the symbol "$RG_B$", is much less than the radial growth of the head cover 21 at 42, represented by the symbol "$RG_H$".

The embodiments of the invention in which an exclusive property or privilege is claimed are defined as follows:

1. A bearing support for the rotatable drive shaft of a hydraulic turbine machine having a head cover structure which is grounded to a turbine supporting structure through which the drive shaft extends;
   a circular bearing surrounding the shaft;
   a circular bearing support means in which said bearing is carried in position for close clearance with the drive shaft said circular bearing support comprising a cylindrical frustrum of a cone, the axis of which is concentric with respect to the axis of the drive shaft, said conic frustrum being operably connected to receive a lateral load from the bearing and transfer the load as shear to the grounded head cover;
   operable means between said bearing and said bearing support means to transfer bearing load to said bearing support means comprising first and second radial rib members, said first rib member being in a horizontal plane and said second rib member being inclined at an angle, both of said ribs interconnecting in a common plane with the top portion of said cylindrical conic frustrum; and,
   the base of said cylindrical conic frustrum is provided with a radial flange which is constructed and arranged to engage with the head cover surface; and,
   there is provided bolt means operably disposed to secure said cylindrical conic frustrum to the grounded head cover, in a manner to permit said cylindrical conic frustrum to follow a radial defection of the head cover where said frustrum is rigidly connected to the head cover;
   whereby an indirect relatively stiff connection is provided between the bearing and the grounded head cover while the radial movement of the head cover is effectively separated from the bearing.

2. A bearing support according to claim 1 wherein said first horizontal rib member is provided with a circular bearing flange on which the bearing is secured; and,
   said second inclined rib member is formed so as to present a horizontal portion having an abutment against which the bearing engages.

3. A bearing support according to claim 1 wherein only one of said first and second radial rib members is provided with operable means of bearing attachment.

4. A bearing support according to claim 3 wherein said one of said first and second radial rib members is said first rib member.

* * * * *